May 6, 1958  H. G. MEISSNER  2,833,392
FEEDER FOR DISCRETE CELLULOSE MATERIAL
Original Filed Dec. 13, 1952  2 Sheets-Sheet 2
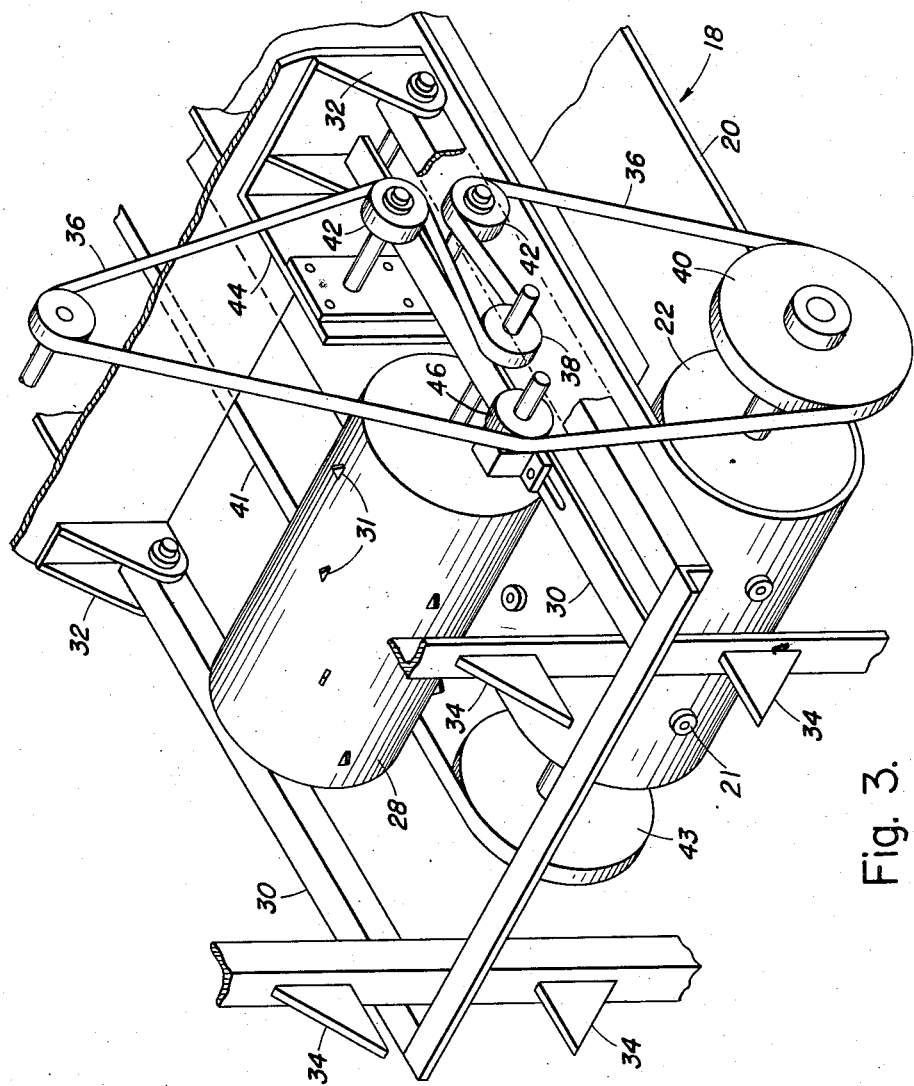
INVENTOR
Harold G. Meissner
ATTORNEY United States Patent Office 2,833,392
Patented May 6, 1958

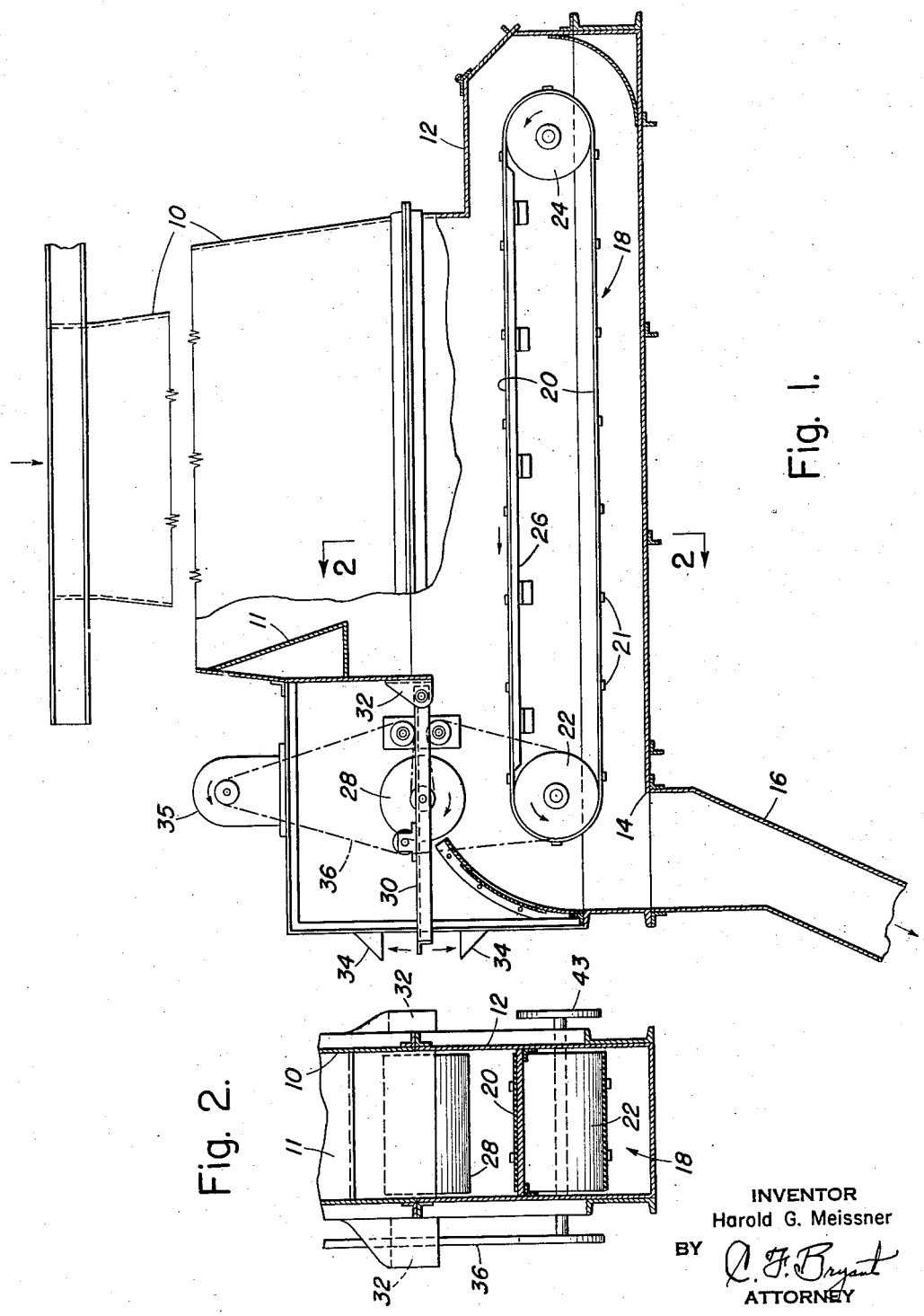

2,833,392

FEEDER FOR DISCRETE CELLULOSE MATERIAL

Harold G. Meissner, Mount Vernon, N. Y., assignor to Combustion Engineering, Inc., a corporation of Delaware Continuation of application Serial No. 325,816, December 13, 1952. This application June 20, 1957, Serial No. 667,311

3 Claims. (Cl. 198—62)

The present invention relates to feeding apparatus and has specific reference to a feeder having a continuous conveyor disposed below a hopper for feeding discrete cellulose material from the hopper.

Considerable difficulty has been experienced in satisfactorily feeding discrete cellulose material from a bin or hopper to a point of use because of the inherent characteristics of this material to cling together and pack into a solid unworkable mass. For example, when feeding bagasse or hogged wood from a storage hopper to a furnace by means of conventional feeding apparatus of the continuous conveyor type it has been found that after a period of time the material becomes jammed or wedged between the conveyor and the hopper resulting in an irregular feed and eventual complete stoppage of said feed.

It is the general object of my invention to provide a feeder for discrete cellulose material that overcomes these difficulties:

Another object of my invention is to provide a feeder for discrete cellulose material having an endless conveyor with means effective to produce a uniform feed of the material and prevent stoppage of said feed.

Other and further objects of my invention will become apparent to those skilled in the art as the description proceeds.

With the aforementioned objects in view, my invention comprises an arrangement, construction and combination of the elements of the feeder in such a manner as to attain the results desired as hereafter more particularly set forth in the following detailed description of an illustrative embodiment; said embodiment being shown by the accompanying drawings wherein:

Fig. 1 is an elevational view of a feeder embodying my invention and having a portion of its side wall removed to better show certain interior details.

Fig. 2 is a section taken on line 2—2 of Fig. 1.

Fig. 3 is an isometric view of a portion of the feeder showing in detail the toothed drum mounting and driving mechanism, this view being in part diagrammatic.

Fig. 4 is a view similar to Fig. 1 but showing a modification for simultaneously feeding two dissimilar materials only one of which is a cellulose material.

Referring now to the drawings, wherein like reference characters are employed throughout to designate like elements, the feeder of Fig. 1 comprises an upright hopper 10 illustratively disclosed as of rectangular section having parallel side walls and outwardly tapered end walls providing a progressively increasing area in the downward direction thereby lessening the tendency for the material to become "hung up" in the hopper. An inwardly projecting baffle 11 is secured to the forward end wall adjacent the lower edge for a purpose hereinafter described. The hopper is provided with an open bottom disposed in a generally horizontal plane and through which communication is established with the interior of conveyor 12.

The side walls of housing 12 are secured to and form a continuation of the side walls of the hopper (Fig. 2) while the end walls of said housing are positioned outwardly of the end walls of the hopper. A discharge opening 14 is provided in the bottom of the housing adjacent one end and has a suitable conduit 16 communicating therewith to convey the material that falls through said opening to a suitable point of use.

Positioned within the housing 12 and operable to convey the material from the hopper to opening 14 at a predetermined rate is an endless conveyor 18. As embodied the conveyor 18 comprises a horizontal endless belt 20 of substantially the same width as housing 12 and stretched between rolls 22 and 24. These rolls are rotatably journaled within the ends of housing 12 located outwardly of the end walls of hopper 10 whereby the upper run of belt 20 spans the full length of the hopper's open bottom. Secured to and projecting above the outer surface of belt 20 are suitable cleats 21 for increasing the frictional engagement of the belt with the material causing a layer of material immediately above said belt to move with the belt. To assist the upper run of belt 20 in supporting the weight of the column of material is hopper 10, support plate 26 is positioned immediately below said upper portion and secured intermediate the side walls of housing 12.

Positioned above the conveyor 18 and adjacent the end of the hopper bottom nearest discharge opening 14 is drum 28 journaled in frame member 30 and provided with radially projecting triangular shaped teeth or cutters 31. Frame member 30 is pivotally mounted on the adjacent end wall of the hopper by means of brackets 32 and has the vertical movement of its outer end limited by stop members 34.

Both drum 28 and conveyor 18 are driven by motor 34 through chain 36, said chain drivingly engaging gears 38 and 40 secured to the shaft of drum 28 and roll 22, respectively, in a manner so that the adjacent surfaces of drum 28 and belt 20 travel in the same direction. Gear 38 is of considerably smaller diameter than gear 40 causing the surface speed of drum 28 to be appreciably greater than that of belt 20. A positive drive is also provided for drum 24 through chain 41 disposed over identical gears 43 secured to the shafts of drums 28 and 22 (the gear 43 secured to the shaft of drum 22 not being shown).

In order to eliminate any vertical force upon drum 28 as a result of the driving mechanism and to allow the drum to have a free floating action in a vertical direction chain 36 is disposed over idler gears 42 in the manner shown. The idler gears are mounted on fixed shafts which are secured to bracket 44 which in turn is secured to the wall of the hopper. These gears are positioned on opposite sides of the plane that includes the axis of drum 28 and the pivotal axis of frame 30 so that with frame 30 in its intermediate position between stops 34 lines drawn from said pivotal axis tangent to the upper and lower portions of the pitch circle of gear 38 are tangent to the pitch circles of the respective idler gears. Through this arrangement the vertical reaction of the drive applying torque will be substantially balanced throughout the pivotal range of frame 30 resulting in the only perceptible force urging drum 28 toward conveyor 18 being the weight of said drum and its associated parts.

To maintain the proper tension of chain 36 idler gear 46 is mounted on frame 30 in a manner so that it may be adjusted longitudinally of said frame to thereby regulate the tension of the chain.

In operation, a discrete cellulose material such as bagasse or hogged wood is fed into hopper 10 by any suitable means (not shown). The column of material in said hopper rests upon the upper run of belt 20 which is continuously moving in the direction toward outlet 14.

This movement of the belt is effective, with the aid of baffle 11, to establish shear planes in said column of material and convey a layer of the material forward in the direction of rapidly revolving drum 28. This drum imposes a beating or fluffing action on the material breaking up compacted masses and in the manner of a milling machine shaving off thin layers of the material resulting in a sheet of fine particles of the material rather than irregular compacted slugs falling from the discharge end of the belt through opening 14.

By pivotally mounting drum 28 in the manner hereinbefore described the drum rests on the layer of material being brought forward by the belt and can move upwardly to pass large pieces of material which may become intermingled with the discrete material thereby preventing possible damage to the mechanism as well as complete stoppage of the feeder.

The embodiment of Fig. 4 comprises a single feeder organized to simultaneously feed two dissimilar discrete materials only one of which is a cellulose material. As an example, one of the materials may be hogged wood and the other coal.

The structural arrangement of this feeder is similar to that of the Fig. 1 embodiment except that in lieu of a single hopper I provide two hoppers 48 and 50 serially disposed with respect to the direction of movement of the endless belt of the conveyor.

Hopper 48 which contains the discrete cellulose material is positioned downstream relative to the direction of movement of the material on the conveyor resulting in the non-cellulose material from hopper 50 forming a bed or layer upon which the cellulose materials rests. Thus as the upper portion of the belt advances toward roller 28 the cellulose material is disposed over the layer of noncellulose material permitting roller 28 to act upon the cellulose material in the manner previously described. Through this arrangement a simultaneous uniform feed of the two materials is produced.

This application is a continuation of my application Serial No. 325,816 filed December 13, 1952, and which is now abandoned.

While I have illustrated and described a preferred embodiment of my novel feeder it is to be understood that such is merely illustrative and not restrictive and that variations and modifications may be made therein without departing from the spirit and scope of the invention. I therefore do not wish to be limited to the precise details set forth but desire to avail myself of such changes and alterations as fall within the purview of my invention.

I claim:

1. In a feeding device of the type described adapted to be positioned below a generally vertical hopper having an opening in the bottom, the combination of a generally horizontal endless conveyor, a toothed drum positioned above said conveyor adjacent one end thereof and extending generally transversely of the upper run of the conveyor, said drum being pivotally mounted for movement toward and away from said upper run and biased toward said upper run by gravity, stop means limiting the movement of the drum toward said upper run, means driving said conveyor and said drum by means of a single motor so that the movement of their proximal surfaces is in the same direction with the upper run of the conveyor moving in the direction toward said drum and with the surface of the drum traveling at a substantially greater speed than that of the conveyor, said last mentioned means comprising driving wheels secured to said drum and the driving mechanism of the conveyor with the latter having a substantially greater diameter than the former, two fixed idler wheels positioned immediately adjacent opposite sides of a plane that includes the axis of the drum and a pivotal axis of the drum mount with the axis of said idler wheels lying in a plane generally normal to the last mentioned plane and adjacent the pivotal axis of the drum mount being intermediate the drum axis and the pivotal axis and disposed so that when the drum is in its normal operating position lines drawn from said pivotal axis tangent to the upper and lower portions, respectively, of the drum driving wheel are tangent to the respective idler wheels and an endless motor driven, driving member serially passing over one of the idler wheels, the drum wheel, the other of the idler wheels and the conveyor wheel.

2. In a feeding device of the type described adapted to be positioned below a generally vertical hopper having an opening in the bottom, the combination of a generally horizontal endless conveyor, a drum positioned above said conveyor adjacent one end thereof and extending generally transversely of the upper run of the conveyor, means presenting triangular shaped teeth extending radially from said drum, said drum being mounted in a frame which pivots about an axis parallel with and horizontally offset from the drum axis inwardly of said one end of the conveyor so that the drum pivotally moves toward and away from the upper run of the conveyor and is biased toward said upper run by gravity, stop means limiting the movement of the drum toward said upper run, means driving said conveyor and said drum by means of a single motor so that the movement of their proximal surfaces is in the same direction with the upper run of the conveyor moving in the direction toward said drum and with the surface of the drum traveling at a substantially greater speed than that of the conveyor, said last mentioned means comprising driving wheels secured to said drum and the driving mechanism of the conveyor with the latter having a substantially greater diameter than the former, two fixed idler wheels positioned immediately adjacent opposite sides of a plane that includes the axis of the drum and the pivotal axis of the drum mount with the axis of said idler wheels lying in a plane generally normal to the last mentioned plane and adjacent the pivotal axis of the drum mount being intermediate the drum axis and the pivotal axis and disposed so that when the drum is in its normal operating position lines drawn from said pivotal axis tangent to the upper and lower portions, respectively, of the drum driving wheel are tangent to the respective idler wheels, and an endless, motor driven, driving member serially passing over one of the idler wheels, the drum wheel, the other of the idler wheels and the conveyor wheel.

3. A fuel feeder for regulating the flow of bagasse and the like to a spreader stoker comprising an endless belt having an upper horizontal surface, an entrance chute having its lower end above the said surface for introducing the bagasse thereon, a discharge chute extending from the discharge end of the belt, there being projecting dogs extending upwardly from the said surface, a toothed drum rotatably mounted about its major axis and disposed so its axis of rotation is horizontal and is above and spaced inwardly from the discharge end of the endless belt transversely thereof, a continuously operating motor means for driving the belt and the drum, and drive mechanism continuously, drivingly interconnecting said motor means and said belt and drum in a manner so that said belt and drum are continuously driven at uniform speed and the peripheral speed of the drum is considerably greater than the surface speed of the belt with adjacent drum and belt surfaces moving toward the discharge end of said belt.

No references cited.